(12) United States Patent
Akimoto

(10) Patent No.: US 12,423,997 B2
(45) Date of Patent: Sep. 23, 2025

(54) FACE AUTHENTICATION SYSTEM, AUTHENTICATION METHOD OF FACE AUTHENTICATION SYSTEM, AND STORAGE MEDIUM

(71) Applicant: CANON KABUSHIKI KAISHA, Tokyo (JP)

(72) Inventor: Yoshiyuki Akimoto, Saitama (JP)

(73) Assignee: Canon Kabushiki Kaisha, Tokyo (JP)

(*) Notice: Subject to any disclaimer, the term of this patent is extended or adjusted under 35 U.S.C. 154(b) by 146 days.

(21) Appl. No.: 18/473,077

(22) Filed: Sep. 22, 2023

(65) Prior Publication Data

US 2024/0104944 A1  Mar. 28, 2024

(30) Foreign Application Priority Data

Sep. 26, 2022 (JP) ................. 2022-152529

(51) Int. Cl.
| | |
|---|---|
| G06V 20/59 | (2022.01) |
| B60R 1/12 | (2006.01) |
| B60R 25/25 | (2013.01) |
| G06V 20/40 | (2022.01) |
| G06V 40/16 | (2022.01) |
| H04N 7/18 | (2006.01) |
| H04N 23/90 | (2023.01) |

(52) U.S. Cl.
CPC ............. *G06V 20/59* (2022.01); *B60R 1/12* (2013.01); *B60R 25/25* (2013.01); *G06V 20/41* (2022.01); *G06V 40/172* (2022.01); *H04N 7/188* (2013.01); *H04N 23/90* (2023.01); *B60R 2001/1223* (2013.01)

(58) Field of Classification Search
CPC ...... G06V 20/59; G06V 20/41; G06V 40/172; G06V 20/593; G06V 40/166; B60R 1/12; B60R 25/25; B60R 2001/1223; B60R 25/305; H04N 7/188; H04N 23/90
See application file for complete search history.

(56) References Cited

U.S. PATENT DOCUMENTS

| | | | |
|---|---|---|---|
| 11,423,676 B2* | 8/2022 | Xiang | G06V 40/172 |
| 2019/0098185 A1* | 3/2019 | Kadomae | H04N 23/56 |
| 2019/0147262 A1* | 5/2019 | Kuehnle | G06Q 10/06398 |
| | | | 340/439 |
| 2019/0147263 A1* | 5/2019 | Kuehnle | G07C 5/0866 |
| | | | 340/439 |

(Continued)

FOREIGN PATENT DOCUMENTS

JP       2005301742 A    10/2005

*Primary Examiner* — James M Pontius
(74) *Attorney, Agent, or Firm* — Canon U.S.A., Inc., IP Division

(57) ABSTRACT

A driver face authentication system provided in a movable apparatus includes a first imaging unit that captures a face of a driver at a first angle, a second imaging unit that captures the driver's face at a second angle different from the first angle, a boarding detection unit that detects that the driver is aboard the movable apparatus, and a face authentication unit that, after the boarding detection unit detects that the driver is aboard the movable apparatus, based on a video captured by the first imaging unit and a video captured by the second imaging unit, determines whether the driver captured by the first and second imaging units is a legitimate driver of the movable apparatus.

12 Claims, 14 Drawing Sheets

(56) References Cited

U.S. PATENT DOCUMENTS

| | | | | |
|---|---|---|---|---|
| 2020/0324784 | A1* | 10/2020 | Liang | G06V 20/597 |
| 2021/0174065 | A1* | 6/2021 | Kumagai | B60N 2/0024 |
| 2021/0331647 | A1* | 10/2021 | Kim | G06V 40/70 |
| 2022/0086335 | A1* | 3/2022 | Kim | B60R 11/04 |
| 2022/0405421 | A1* | 12/2022 | Endo | G06F 21/6245 |
| 2025/0071408 | A1* | 2/2025 | Shimizu | H04N 23/71 |

* cited by examiner

WHEN DIGITAL SIDE
MIRROR UNIT 20 IS OPENED

WHEN DIGITAL SIDE
MIRROR UNIT 20 IS STORED

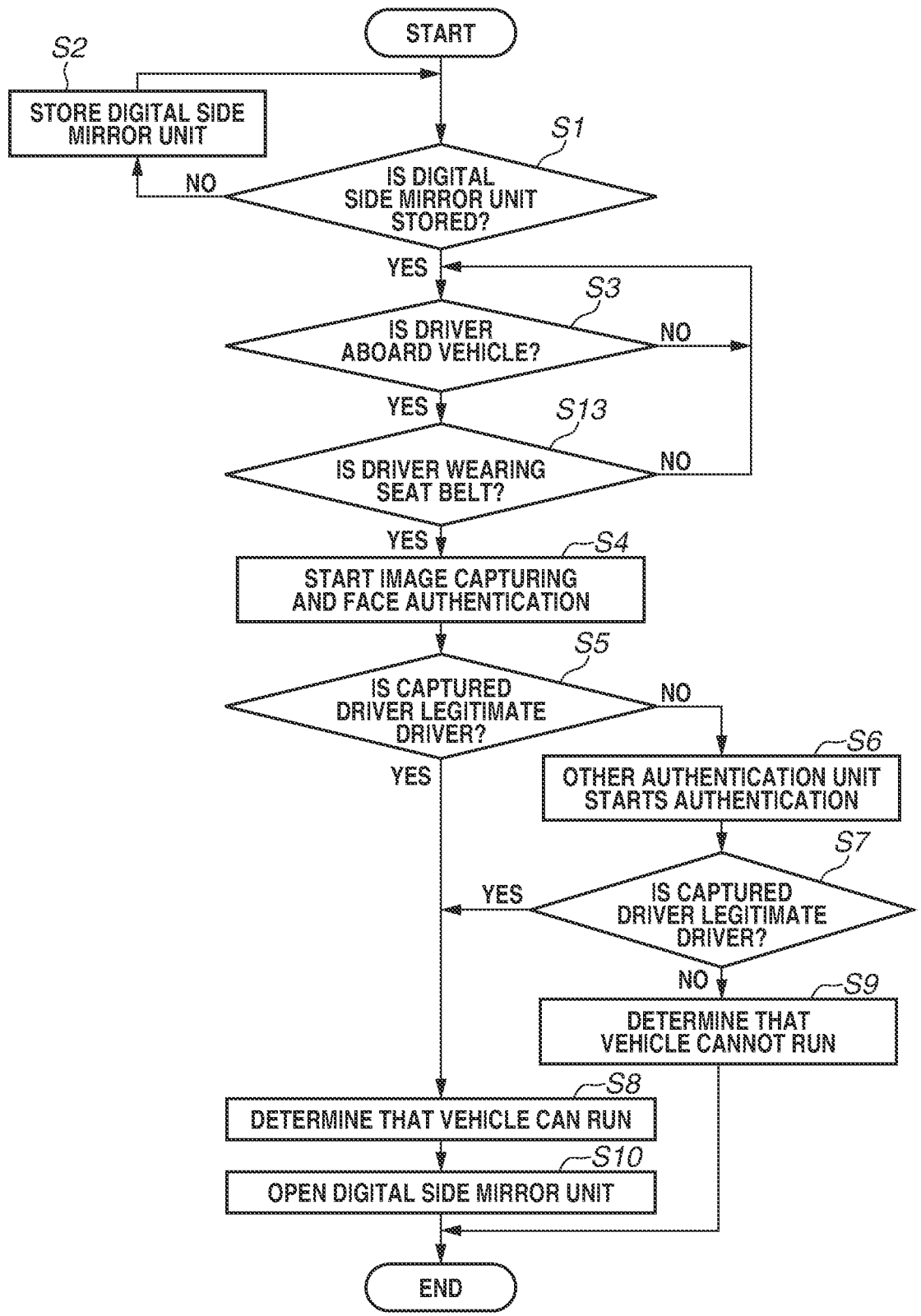

BEFORE ANGLE IS CHANGED

AFTER ANGLE IS CHANGED

FACE AUTHENTICATION SYSTEM, AUTHENTICATION METHOD OF FACE AUTHENTICATION SYSTEM, AND STORAGE MEDIUM

BACKGROUND

Field

The present disclosure relates to a face authentication system, an authentication method of a face authentication system, and a storage medium.

Description of the Related Art

Conventionally, for vehicles, side mirrors are provided as a method for drivers to check the rear sides of the driver's vehicle. In recent years, to improve visibility in bad weather and reduce blind spots, there is a case where camera-type side mirrors (generally called "digital side mirrors") are used for capturing the rear sides of a driver's vehicle using cameras outside the vehicle to let the driver check the states of the rear sides on a monitor in the vehicle.

In addition, for vehicles, there is also conventionally facial authentication of a driver to automatic adjustment of the positions of the vehicle's driver seat and steering wheel, as well as to prevent theft of the vehicle. In a case where face authentication is performed using a single camera, an issue exists that the driver's face can be forged using an image of the driver's face. To address this, Japanese Patent Application Laid-Open No. 2005-301742 discusses the use of a near-infrared camera.

However, in a case where a near-infrared camera is used, an issue arises where the recognition rate of face authentication decreases under the influence of light, such as sunlight, containing an intense near-infrared light component. To achieve forgery prevention without using a near-infrared camera, there is also a method of capturing the face at two or more angles and performing face authentication. However, face authentication cannot always be performed accurately regardless of when the face is captured. If the face is not captured at an angle close to the front, the accuracy of face authentication decreases.

SUMMARY

The present disclosure is directed to preventing a forgery using a face photograph and starting face authentication at an appropriate timing. According to an aspect of the present invention, a driver face authentication system provided in a movable apparatus includes a first imaging unit configured to capture a face of a driver at a first angle, a second imaging unit configured to capture the driver's face at a second angle different from the first angle, a boarding detection unit configured to detect that the driver is aboard the movable apparatus, and a face authentication unit configured to, after the boarding detection unit detects that the driver is aboard the movable apparatus, based on a video captured by the first imaging unit and a video captured by the second imaging unit, determine whether the driver captured by the first and second imaging units is a legitimate driver of the movable apparatus.

Further features of the present disclosure will become apparent from the following description of exemplary embodiments with reference to the attached drawings.

BRIEF DESCRIPTION OF THE DRAWINGS

FIG. 8 is a flowchart illustrating a flow of processing of the face authentication system.

DESCRIPTION OF THE EMBODIMENTS

Figure 1:
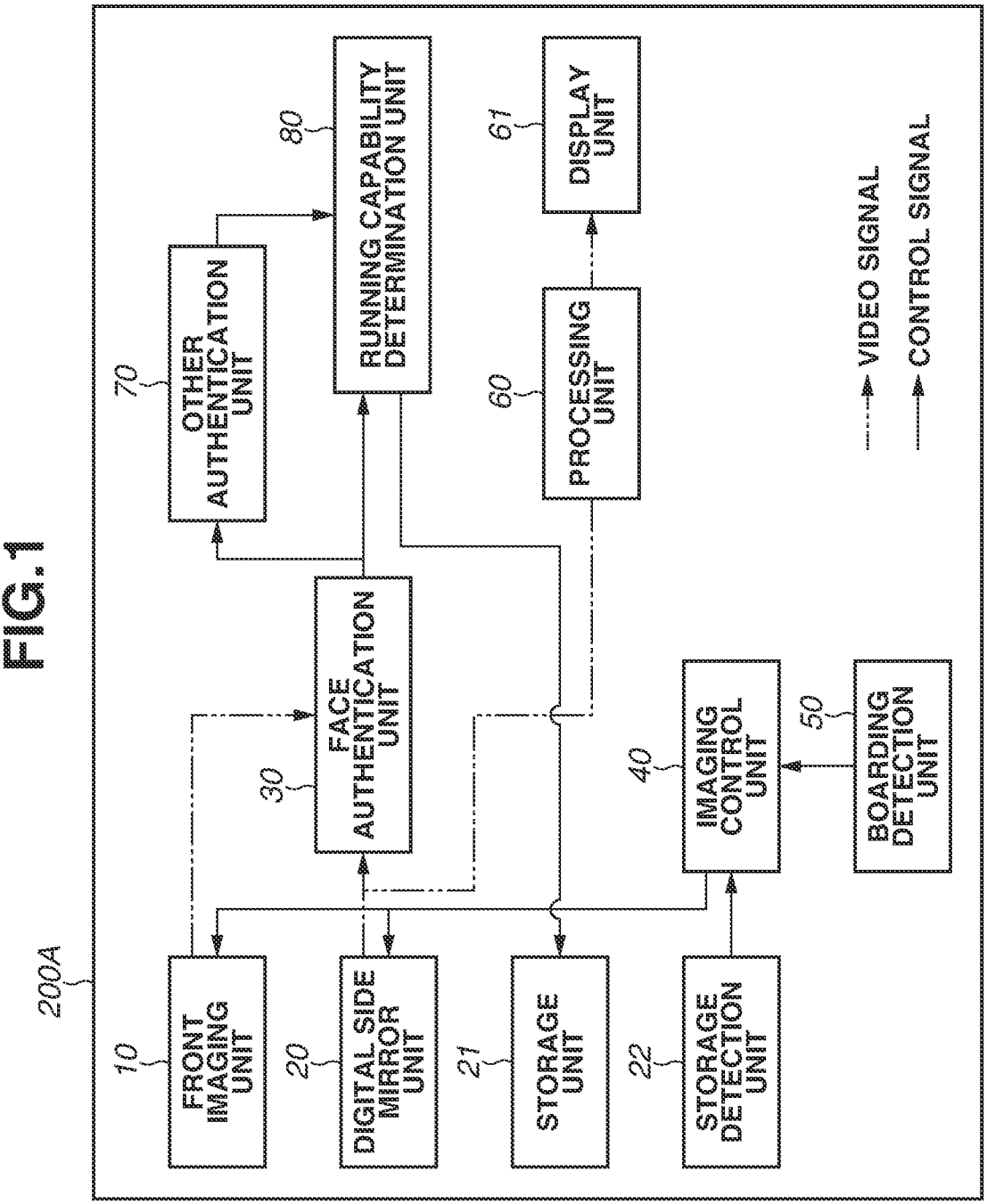
FIG. 1 is a diagram illustrating an example of a configuration of a face authentication system.

Exemplary embodiments will be described in detail below with reference to the drawings. In the drawings, the same members are designated by the same reference numbers, and are not redundantly described.

FIG. 1 is a diagram illustrating an example of the configuration of a face authentication system 200A of a vehicle according to a first exemplary embodiment. In the first exemplary embodiment, the face authentication system 200A includes a digital side mirror unit 20 as a camera for capturing an image of the vehicle's rear side in addition to a front imaging unit 10 and recognizes the driver's face by image capturing at a plurality of angles.

The face authentication system 200A includes the front imaging unit 10, the digital side mirror unit 20, a storage unit 21, a storage detection unit 22, a face authentication unit 30, an imaging control unit 40, a boarding detection unit 50, a processing unit 60, a display unit 61, an other authentication unit 70, and a running capability determination unit 80.

The front imaging unit 10 is a camera installed in front of the driver's seat of the vehicle and captures a front view image of the driver's face. The front imaging unit 10 can share an imaging function with a camera for the purpose of observing the state of the driver while driving, such as a driver monitoring system (DMS). The timing of image capturing by the front imaging unit 10 in face authentication is controlled by the imaging control unit 40. The front imaging unit 10 transmits a video obtained by capturing the image of the driver's face to the face authentication unit 30.

Figure 2A:
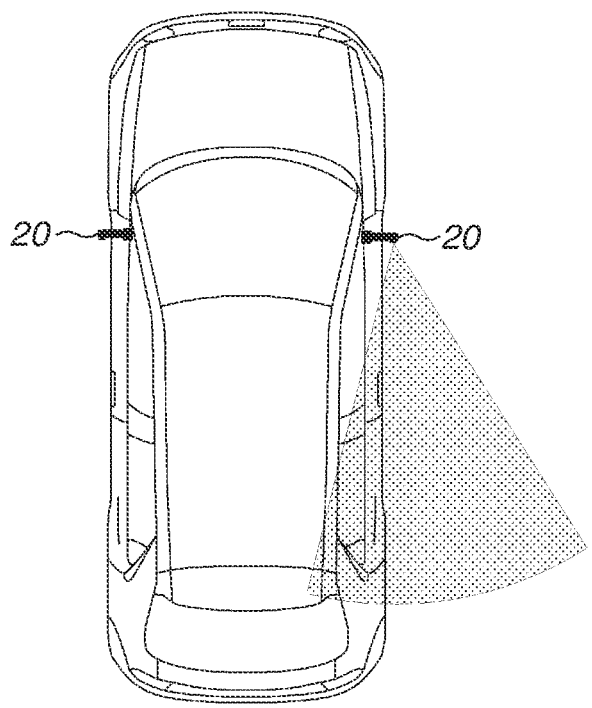
FIGS. 2A and 2B are diagrams respectively illustrating an imaging range of a digital side mirror when the digital side mirror is opened and stored.

As illustrated in FIG. 2A, the digital side mirror unit 20 is an imaging unit installed on both the vehicle's left and right sides, and captures an image of the vehicle's rear side. To monitor the vehicle's rear side, the digital side mirror unit 20 captures the image of the vehicle's rear side while the vehicle's engine is operating, the processing unit 60 processes a video obtained by capturing the image of the vehicle's rear side, the display unit 61 displays the processed video, and the driver confirms the video of the vehicle's rear side displayed on the display unit 61.

Figure 2B:
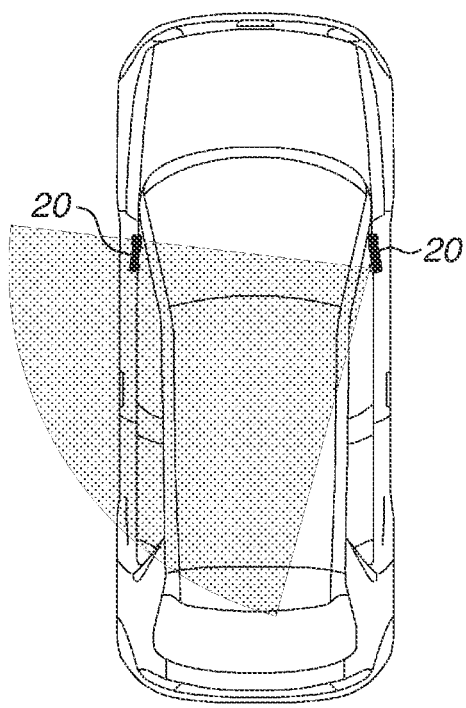

The digital side mirror unit 20 can be stored in the storage unit 21. As illustrated in FIG. 2B, the digital side mirror unit 20 is stored when the vehicle is not used. When the digital side mirror unit 20 is stored, the digital side mirror unit 20 is at an angle at which the digital side mirror unit 20 can capture a profile view image of the driver's face. The digital side mirror unit 20 is used for the purpose of capturing the profile view image in face authentication. The timing of image capturing by the digital side mirror unit 20 in face authentication is controlled by the imaging control unit 40. The digital side mirror unit 20 transmits a video obtained by capturing the profile view image of the driver's face to the face authentication unit 30.

The storage unit 21 is a mechanism for electrically opening and storing the digital side mirror unit 20. FIG. 2A is a diagram illustrating the imaging range of the digital side minor unit 20 when opened. FIG. 2B is a diagram illustrating the imaging range of the digital side mirror unit 20 when stored. If the running capability determination unit 80 determines that the vehicle can run (move), then as illustrated in FIG. 2A, the digital side minor unit 20 is opened by the storage unit 21 and captures the image of the vehicle's rear side. When the vehicle is not used, the digital side mirror unit 20 is stored in the storage unit 21. In the state where the digital side mirror unit 20 is stored as illustrated in FIG. 2B, the digital side mirror unit 20 can capture the profile view image of the driver's face. While FIGS. 2A and 2B illustrate a right-hand-drive vehicle as an example, this example is not seen to be limiting.

The storage detection unit 22 detects that the digital side mirror unit 20 is stored in the storage unit 21. If the storage detection unit 22 detects that the digital side mirror unit 20 is stored in the storage unit 21, the storage detection unit 22 notifies the imaging control unit 40 of the detection result.

Based on a video of a front view image of the driver's face captured by the front imaging unit 10 and a video of the profile view image of the driver's face captured by the digital side mirror unit 20, the face authentication unit 30 determines whether the driver seated in the driver's seat is a legitimate driver.

Figure 3:
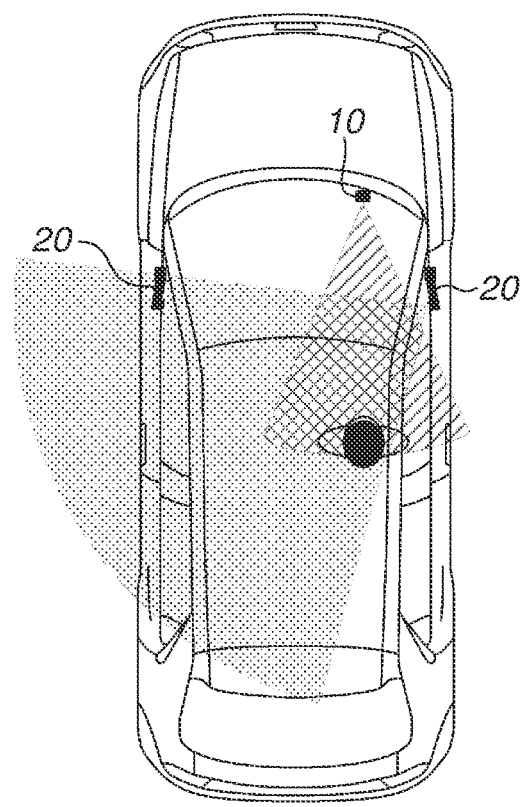
FIG. 3 is a diagram illustrating a state where a front view image and a profile view image of a driver's face are captured.

FIG. 3 is a diagram illustrating an imaging range when the front imaging unit 10 captures the front view image of the driver's face and the digital side mirror unit 20 captures the profile view image of the driver's face. The face authentication unit 30 includes a storage unit that stores data of the front view image and the profile view image of the legitimate driver's face. A plurality of legitimate drivers can be registered as drivers allowed to drive a target vehicle. The face authentication unit 30 detects a face from videos captured by the front imaging unit 10 and the digital side mirror unit 20 and calculates information useful to identify a person, such as the shapes of and the positional relationships between the eyes and the nose, as a feature amount. The face authentication unit 30 checks the feature amount of the front view image and the profile view image of the legitimate driver stored in the storage unit against the feature amount of the front view image of the face and the profile view image of face of the captured driver. Based on whether the degree of similarity between the feature amounts exceeds a certain value, the face authentication unit 30 determines whether the captured driver is the legitimate driver. The method for determining whether the captured driver is the legitimate driver is not limited to this.

The face authentication unit 30 notifies the running capability determination unit 80 of the result of determining that the driver seated in the driver's seat is the legitimate driver. The face authentication unit 30 notifies the other authentication unit 70 of the result of determining that the driver seated in the driver's seat is not the legitimate driver. While FIG. 3 illustrates a driver's seat on the right side of the vehicle as an example, this is not seen to be limiting. The digital side mirror unit 20 on the driver's seat side close to the driver's face is assumed as the digital side mirror unit 20. The profile view image of the driver's face can be captured using the digital side mirror unit 20 on the passenger's seat side.

Using, as a trigger, the fact that the storage detection unit 22 detects that the digital side mirror unit 20 is stored, and the fact that the boarding detection unit 50 detects that the driver is aboard the vehicle, the imaging control unit 40 controls the front imaging unit 10 and the digital side mirror unit 20 to start image capturing.

The boarding detection unit 50 detects that the driver is aboard the vehicle in the driver's seat. As the detection method, based on the fact that the side door on the driver's seat side is closed after being opened, the boarding detection unit 50 detects that the driver is aboard the vehicle in the driver's seat. To exclude the mere opening and closing of the side door when the driver is not seated in the driver's seat, the boarding detection unit 50 can also detect the weight of the driver's seat at the same time. If the boarding detection unit 50 detects that the driver is aboard the vehicle in the driver's seat, the boarding detection unit 50 notifies the imaging control unit 40 of the detection result.

The processing unit 60 performs a light and dark correction process, a distortion correction process, and a clipping process on a video of the vehicle's rear side captured by the digital side mirror unit 20, thereby obtaining a video that can be easily checked by the driver.

While a video captured by the digital side mirror unit 20 is directly input to the face authentication unit 30 in FIG. 1, this is not seen to be limiting. In another embodiment, a video processed by the processing unit 60 can be input to the face authentication unit 30.

The display unit 61 is a liquid crystal display located in the vehicle. The display unit 61 displays a video processed by the processing unit 60 so that the driver can confirm the video. The driver checks the safety of the vehicle's rear side by viewing the video displayed on the display unit 61.

If authentication by the face authentication unit 30 fails even when the legitimate driver is seated in the driver's seat, the other authentication unit 70 determines that the driver is the legitimate driver using another method. The other authentication unit 70 notifies the running capability determination unit 80 of the result of the determination. If the digital side mirror unit 20 fails in image capturing, the other authentication unit 70 can additionally request the driver by voice to perform the action of moving the driver's face to the left and to the right, and can perform face authentication using the front imaging unit 10 alone, thereby taking forgery prevention measures. In another embodiment, the other authentication unit 70 can enable the driver to input a personal identification number and a password. Then, based on whether the input personal identification number and password match a pre-registered personal identification number and a password to permit authentication, the other authentication unit 70 can determine whether the driver is the legitimate driver.

The above example is merely an example of an authentication method employed by the other authentication unit 70, and is not seen to be limiting. Since the other authentication unit 70 requests the driver to perform some action or operation, authentication by the other authentication unit 70 has lower priority than authentication by the face authentication unit 30. There may be a plurality of other authentication units 70, and the plurality of other authentication units 70 can be applied in a stepwise manner. For example, in a case where the other authentication unit 70 fails in authentication when the other authentication unit 70 additionally requests the driver to perform the action of moving the driver's face to the left and to the right and performs face authentication using the front imaging unit 10 alone, the other authentication unit 70 can prompt the driver to input a personal identification number and a password, and can authenticate the driver, thereby performing authentication at multiple steps.

If the running capability determination unit 80 receives from the face authentication unit 30 or the other authentication unit 70 a notification that the driver is recognized as the legitimate driver, the running capability determination unit 80 determines that the vehicle can run. If the running capability determination unit 80 determines that the vehicle can run, the running capability determination unit 80 permits the driver to start the vehicle's engine and to shift the vehicle into drive. If the running capability determination unit 80 determines that the vehicle can run, the running capability determination unit 80 controls the storage unit 21 to open the digital side mirror unit 20.

While the running capability determination unit 80 is configured to control the storage unit 21 to open the digital side mirror unit 20 in FIG. 1, this is not seen to be limiting. In another embodiment, the running capability determination unit 80 can control the storage unit 21 via the imaging control unit 40 to open the digital side mirror unit 20.

If neither the face authentication unit 30 or the other authentication unit 70 determine that the driver is the legitimate driver, the running capability determination unit 80 determines that the vehicle cannot run, and does not enable the driver to start the vehicle's engine and put the vehicle into drive. This prevents the vehicle from being driven and prevents theft of the vehicle. If the running capability determination unit 80 determines that the vehicle cannot run, the running capability determination unit 80 can transmit videos of the front view image captured by the front imaging unit 10 and the profile view image captured by the digital side mirror unit 20 to the legitimate driver, and the videos could be used as circumstantial evidence in a case of a vehicle theft. While face authentication has been described in the present exemplary embodiment, if the running capability determination unit 80 determines that the vehicle can run, the running capability determination unit 80 can also automatically adjust the position of the seat and the position of the steering wheel in the vehicle.

Figure 4:
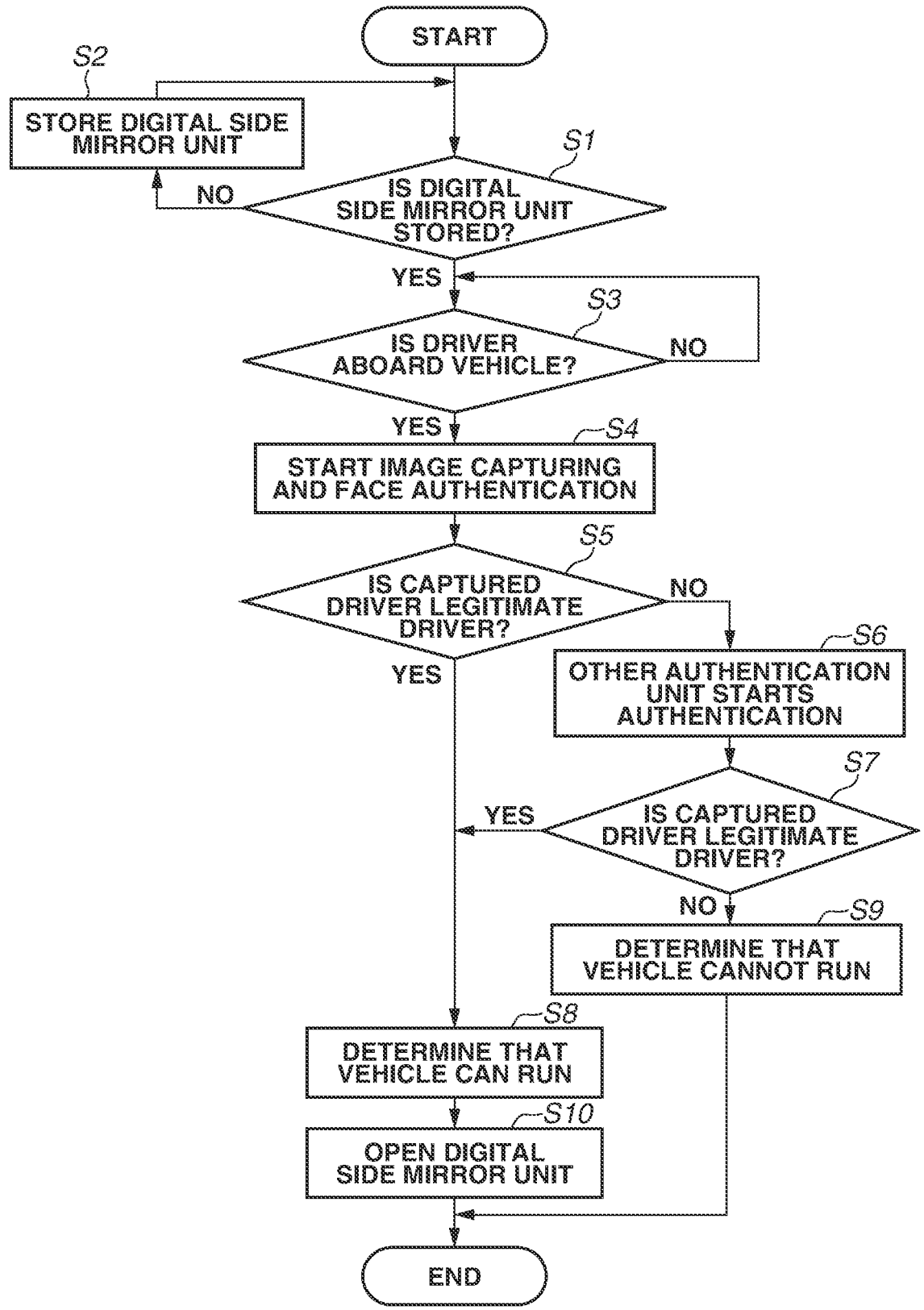
FIG. 4 is a flowchart illustrating a flow of processing of the face authentication system.

FIG. 4 is a flowchart illustrating the flow of the processing of an authentication method of the face authentication system 200A in FIG. 1. In step S1, the storage detection unit 22 detects whether the digital side mirror unit 20 is stored in the storage unit 21. Based on the detection result of the storage detection unit 22, the imaging control unit 40 determines whether the digital side mirror unit 20 is stored. If the digital side mirror unit 20 is stored (YES in step S1), the processing proceeds to step S3. If the digital side mirror unit 20 is not stored (NO in step S1), the processing proceeds to step S2.

In step S2, the imaging control unit 40 controls the storage unit 21 to store the digital side mirror unit 20. The storage unit 21 stores the digital side mirror unit 20 as illustrated in FIG. 2B. Then, the processing returns to step S1.

In step S3, the boarding detection unit 50 detects whether the driver is in the vehicle. Based on the detection result of the boarding detection unit 50, the imaging control unit 40 determines whether the driver is aboard the vehicle. If the driver is not aboard the vehicle (NO in step S3), the processing remains in step S3. If the driver is aboard the vehicle (YES in step S3), the processing proceeds to step S4.

In step S4, the imaging control unit 40 controls the front imaging unit 10 and the digital side mirror unit 20 to start image capturing. The front imaging unit 10 starts capturing the front view image of the driver's face, and the digital side mirror unit 20 starts capturing the profile view image of the driver's face. Based on a video of the front view image of the driver's face captured by the front imaging unit 10 and a video of the profile view image of the driver's face captured by the digital side mirror unit 20, the face authentication unit 30 authenticates the driver's face. Then, the processing proceeds to step S5.

In step S5, the face authentication unit 30 compares data of the front view image of the face and the profile view image of the legitimate driver stored in the storage unit and the videos of the front view image of the face and the profile view image of the above captured driver and determines whether the captured driver is the legitimate driver. If the captured driver is the legitimate driver (YES in step S5), the processing proceeds to step S8. If the captured driver is not the legitimate driver (NO in step S5), the processing proceeds to step S6.

In step S6, using a method different from that of the face authentication unit 30, the other authentication unit 70 starts authenticating whether the driver is the legitimate driver. Then, the processing proceeds to step S7.

In step S7, based on the result of the authentication in step S6, the other authentication unit 70 determines whether the driver is the legitimate driver. If the driver is the legitimate driver (YES in step S7), the processing proceeds to step S8. If the driver is not the legitimate driver (NO in step S7), the processing proceeds to step S9.

In step S8, based on the determination result in step S5 or S7, the running capability determination unit 80 determines that the vehicle can run. Then, the processing proceeds to step S10.

In step S9, based on the determination results in steps S5 and S7, the running capability determination unit 80 determines that the vehicle cannot run. Then, the processing of the flowchart in FIG. 4 ends.

In step S10, the running capability determination unit 80 controls the storage unit 21 to open the digital side mirror unit 20. The storage unit 21 opens the digital side minor unit 20 as illustrated in FIG. 2A. Then, the processing of the flowchart in FIG. 4 ends.

While in the present exemplary embodiment, a case has been described where the front imaging unit 10 captures the front view image of the driver's face and the digital side mirror unit 20 captures the profile view image of the driver's face, this is not seen to be limiting. In another embodiment, the front imaging unit 10 can capture the profile view image of the driver's face, and the digital side mirror unit 20 can capture the front view image of the driver's face.

If the face authentication unit 30 performs face authentication based only on a video captured by the front imaging unit 10 without using a video captured by the digital side mirror unit 20, a forgery using a face photograph can occur. In the present exemplary embodiment, the face authentication unit 30 performs face authentication based on a video captured by the digital side mirror unit 20 and a video captured by the front imaging unit 10, thereby enabling possible prevention of a forgery using a face photograph. The face authentication system 200A captures the profile view image of the driver's face using the digital side mirror unit 20 without using a dedicated camera. This provides for reduction in cost of the authentication system 200A.

As described above, the face authentication system 200A is a driver face authentication system provided in a movable apparatus. The movable apparatus in the present exemplary embodiment is a vehicle, but this is not seen to be limiting. The front imaging unit 10 captures an image of driver's face at a first angle. The digital side mirror unit 20 captures an image of the driver's face at a second angle different from the first angle. For example, the front imaging unit 10 captures a front view image of the driver's face, and the digital side mirror unit 20 captures a profile view image of the driver's face. The boarding detection unit 50 detects that the driver is aboard the movable apparatus.

After the boarding detection unit 50 detects that the driver is aboard the movable apparatus, the front imaging unit 10 and the digital side mirror unit 20 start image capturing. After the boarding detection unit 50 detects that the driver is aboard the movable apparatus, the face authentication unit 30, based on a video captured by the front imaging unit 10 and a video captured by the digital side mirror unit 20, starts determining whether the driver captured by the front imaging unit 10 and the digital side mirror unit 20 is a legitimate driver.

In a case where the face authentication unit 30 determines that the above captured driver is not the legitimate driver, the other authentication unit 70 determines whether the driver is the legitimate driver using a method different from a method of the face authentication unit 30.

The digital side mirror unit 20 captures the image of the driver's face at the second angle and captures a rear side of the movable apparatus at a third angle different from the second angle. During the determination of the face authentication unit 30, the digital side mirror unit 20 captures the image of the driver's face at the second angle, and after the face authentication unit 30 determines that the above captured driver is the legitimate driver, the digital side mirror unit 20 captures the movable apparatus' rear side at the third angle. The second angle is, for example, an angle in a state where the digital side mirror unit 20 is stored as illustrated in FIG. 2B.

In a case were a driver turns the driver's face toward the front imaging unit 10, the front imaging unit 10 captures the front view image of the driver's face, and the digital side mirror unit 20 captures the profile view image of the driver's face. In a case were the driver turns the driver's face toward the digital side mirror unit 20, the front imaging unit 10 captures the profile view image of the driver's face and the digital side mirror unit 20 captures the front view image of the driver's face. Based on videos captured by the front imaging unit 10 and the digital side mirror unit 20, the face authentication unit 30 determines whether the driver is the legitimate driver.

Based on the above, according to the present exemplary embodiment, the face authentication system 200A performs face recognition by image capturing at a plurality of angles using the front imaging unit 10 and the digital side mirror unit 20 without requiring a dedicated camera. Consequently, the face authentication system 200A can prevent a forgery using a face photograph and improve authentication accuracy while reducing costs.

In the present exemplary embodiment, a description has been provided of a method where the face authentication system 200A performs face recognition using videos captured by the front imaging unit 10 and the digital side mirror unit 20. Use of the face authentication system 200A enables improvement in the recognition rate of face authentication of a driver facing towards the front of the vehicle. In a second exemplary embodiment, a description is provided of a method for improving the recognition rate of face authentication by measures for causing the driver to face towards the front of the vehicle when face authentication is performed.

Figure 5:
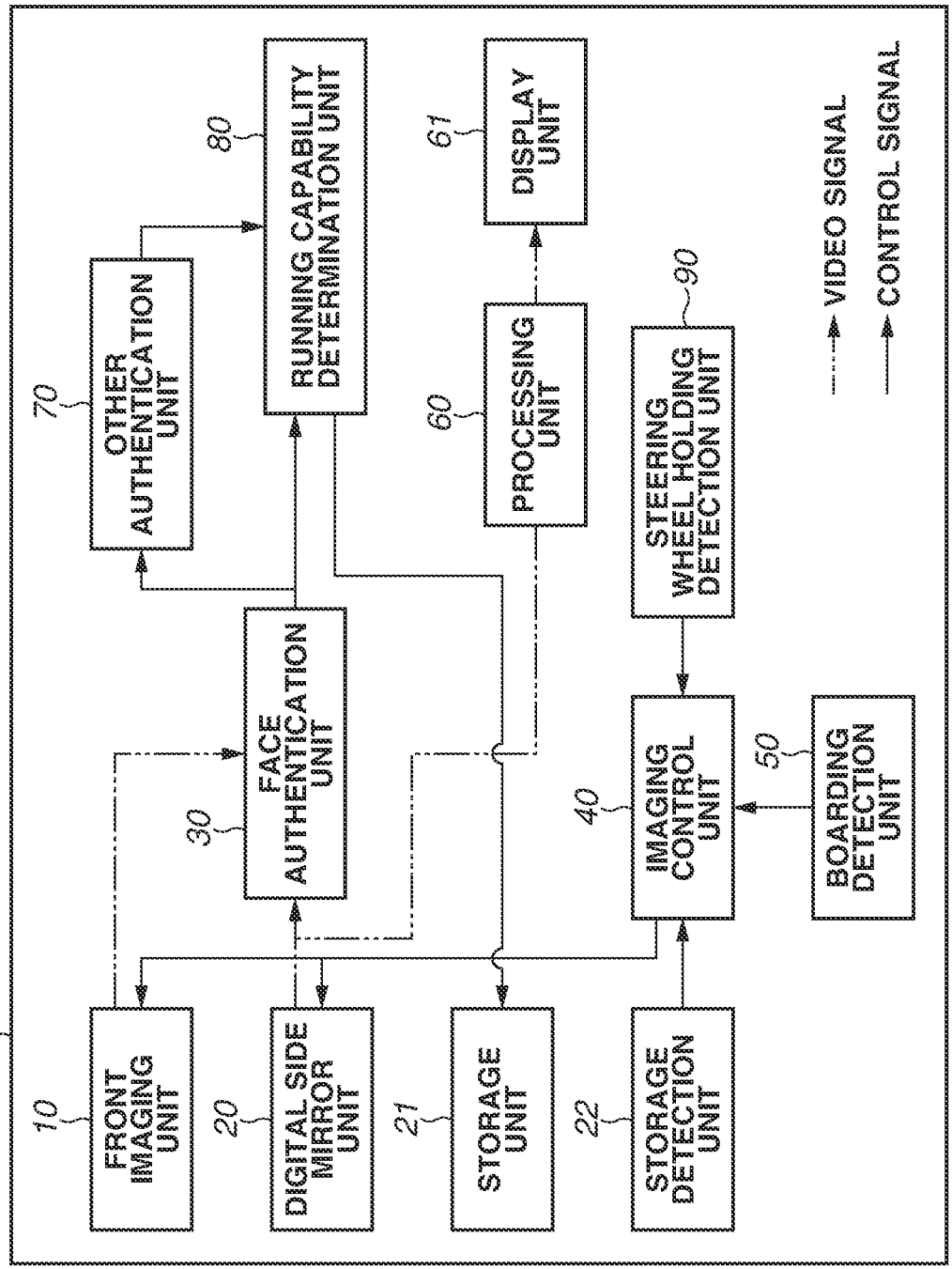
FIG. 5 is a diagram illustrating an example of a configuration of a face authentication system.

FIG. 5 is a diagram illustrating an example of the configuration of a face authentication system 200B according to the second exemplary embodiment. The face authentication system 200B includes the front imaging unit 10, the digital side mirror unit 20, the storage unit 21, the storage detection unit 22, the face authentication unit 30, the imaging control unit 40, the boarding detection unit 50, the processing unit 60, the display unit 61, the other authentication unit 70, and the running capability determination unit 80. The face authentication system 200B also includes a steering wheel holding detection unit 90.

The face authentication system 200B is obtained by adding the steering wheel holding detection unit 90 to the face authentication system 200A in FIG. 1. The differences between the second and first exemplary embodiments will be described below.

In the face authentication system 200B, components other than the steering wheel holding detection unit 90 and the imaging control unit 40 are similar to those in the face authentication system 200A in FIG. 1, and therefore are not described.

The steering wheel holding detection unit 90 detects holding of the steering wheel of the vehicle by the driver.

When the driver is holding the steering wheel, the driver is less likely to face directions other than towards the front of the vehicle. Thus, detection that the driver is holding the steering wheel can help enhance the recognition rate of face authentication. If the steering wheel holding detection unit 90 detects that the driver is holding the steering wheel, the steering wheel holding detection unit 90 notifies the imaging control unit 40 of the detection result. The steering wheel holding detection unit 90 can use, as a method for detecting that the driver is holding the steering wheel, a torque sensor or a capacitive sensor provided in the steering wheel, but this is not seen to be limiting.

Using as a trigger the detection result that the digital side mirror unit 20 is stored, the detection result that the driver is aboard the vehicle, and the detection result that the driver is holding the steering wheel, the imaging control unit 40 controls the front imaging unit 10 and the digital side mirror unit 20 to start image capturing.

Figure 6:
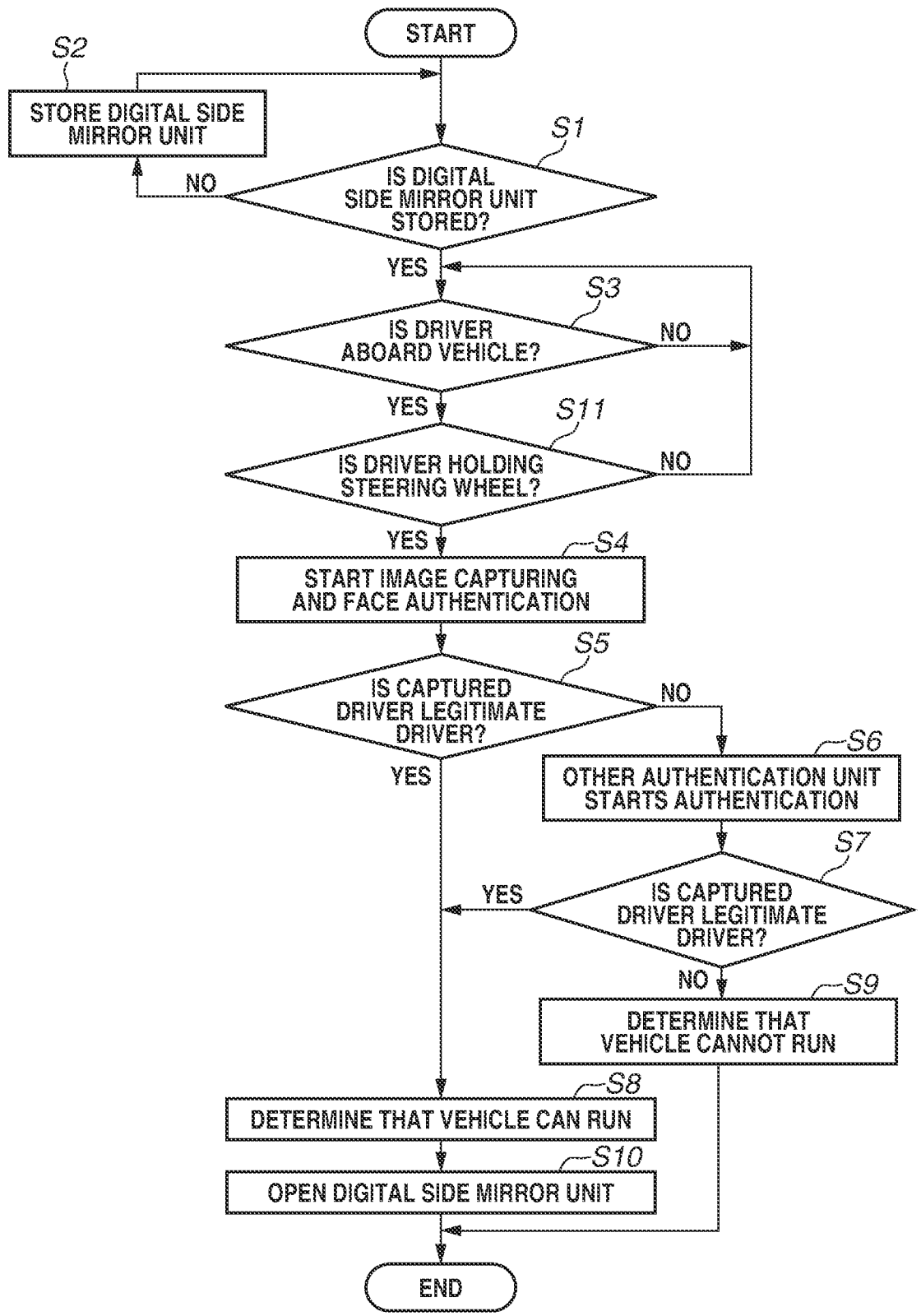
FIG. 6 is a flowchart illustrating a flow of processing of the face authentication system.

FIG. 6 is a flowchart illustrating the flow of the processing of an authentication method of the face authentication system 200B in FIG. 5. FIG. 6 is obtained by adding step S11 to FIG. 4. The differences between FIGS. 6 and 4 will be described below.

In step S3, the boarding detection unit 50 detects whether the driver is aboard the vehicle. Based on the detection result of the boarding detection unit 50, the imaging control unit 40 determines whether the driver is aboard the vehicle. If the driver is not aboard the vehicle (NO in step S3), the processing remains in step S3. If the driver is aboard the vehicle (YES in step S3), the processing proceeds to step S11.

In step S11, the steering wheel holding detection unit 90 detects whether the driver is holding the steering wheel. Based on the detection result of the steering wheel holding detection unit 90, the imaging control unit 40 determines whether the driver is holding the steering wheel. If the driver is not holding the steering wheel (NO in step S11), the processing returns to step S3. If the driver is holding the steering wheel (YES in step S11), the processing proceeds to step S4. The processes of steps other than step S11 are similar to those in FIG. 4, and therefore are not described here in.

As described above, the steering wheel holding detection unit 90 detects whether the driver is holding the steering wheel. When the driver is holding the steering wheel, the driver is likely to be facing the front of the vehicle. Thus, the front imaging unit 10 and the digital side mirror unit 20 start image capturing, and the face authentication unit 30 starts face authentication. The front imaging unit 10 and the digital side mirror unit 20 can capture the driver's face in the state where the driver is facing the front of the vehicle. Thus, it is possible to improve the recognition rate of face authentication in the face authentication unit 30.

The steering wheel holding detection unit 90 detects that the driver is holding a steering wheel of the movable apparatus (e.g., a vehicle). After the boarding detection unit 50 detects that the driver is aboard the movable apparatus and the steering wheel holding detection unit 90 detects that the driver is holding the steering wheel of the movable apparatus, the face authentication unit 30 starts determining whether the above captured driver is the legitimate driver.

Based on the above description, according to the present exemplary embodiment, the face authentication system 200B can improve the recognition rate of face authentication by measures to cause a driver to face the front of the vehicle when face authentication is performed. Consequently, it is possible to improve the recognition rate of face authentication in a case where the face authentication system 200B is used.

In a third exemplary embodiment, a description will be provided of a method for improving the recognition rate of face authentication by measures to cause the driver to face the front of the vehicle when face authentication is performed using a method different from the method described in the second exemplary embodiment.

Figure 7:
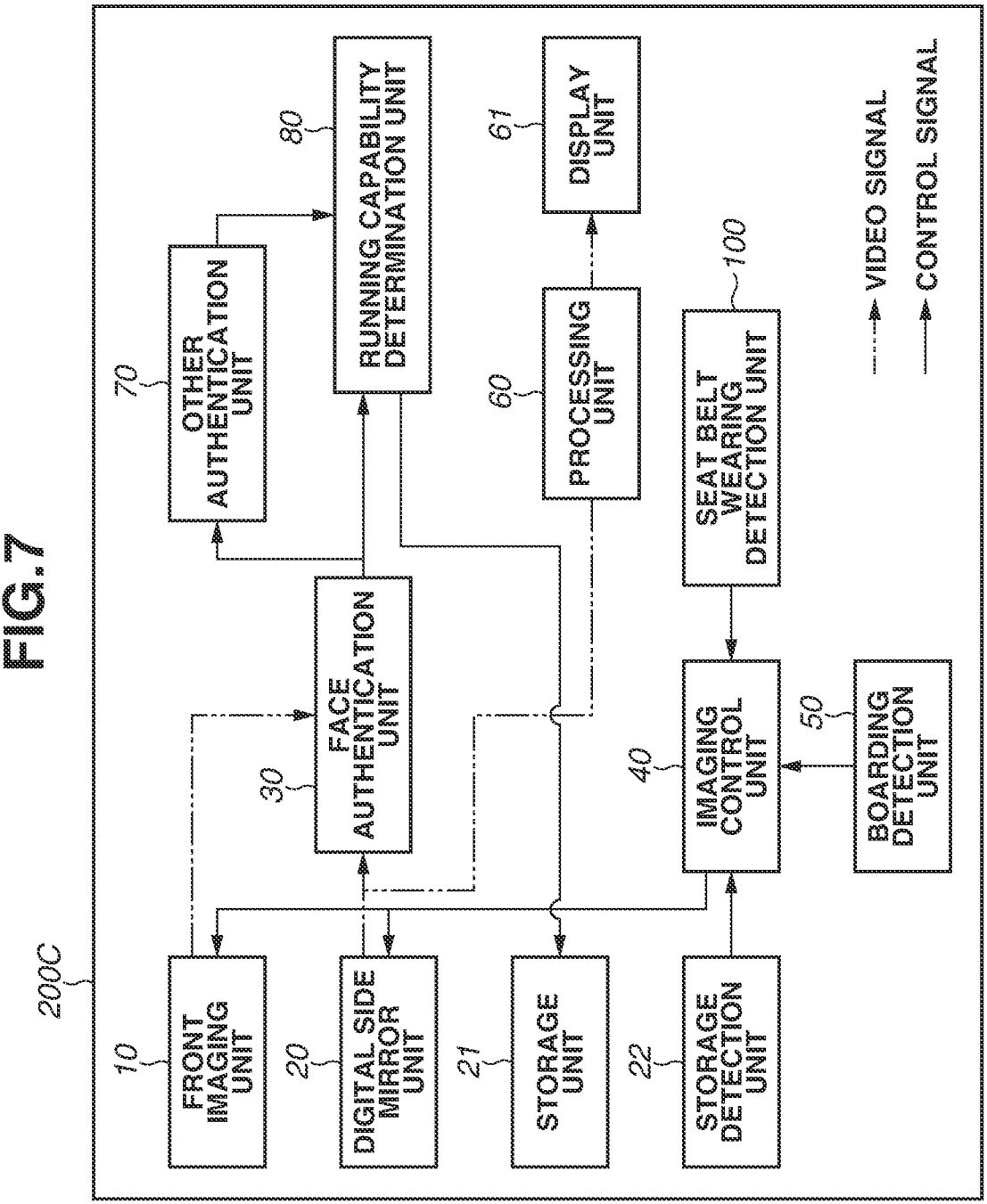
FIG. 7 is a diagram illustrating an example of a configuration of a face authentication system.

FIG. 7 is a diagram illustrating an example of the configuration of a face authentication system 200C according to the third exemplary embodiment. The face authentication system 200C includes the front imaging unit 10, the digital side mirror unit 20, the storage unit 21, the storage detection unit 22, the face authentication unit 30, the imaging control unit 40, the boarding detection unit 50, the processing unit 60, the display unit 61, the other authentication unit 70, and the running capability determination unit 80. The face authentication system 200C also includes a seat belt wearing detection unit 100.

The face authentication system 200C is obtained by adding the seat belt wearing detection unit 100 to the face authentication system 200A in FIG. 1. The differences between the third and first exemplary embodiments will be described below.

In the face authentication system 200C, components other than the seat belt wearing detection unit 100 and the imaging control unit 40 are similar to those in the face authentication system 200A in FIG. 1, and therefore will not be described.

The seat belt wearing detection unit 100 detects whether the driver is wearing a seat belt of the vehicle. A driver attempting to secure the seat belt is one example of a situation where a driver does not face towards the front of the vehicle after the driver sits in the driver's seat. It can only be after the driver is wearing the seat belt that the driver faces towards the front of the vehicle. Thus, detecting that the driver is wearing the seat belt can help enhance the recognition rate of face authentication. For example, detection by the seat belt wearing detection unit 100 whether the driver is wearing the seat belt can be achieved using a switch placed in a slot into which the buckle of the seat belt is inserted. If the seat belt wearing detection unit 100 detects that the driver is wearing the seat belt, the seat belt wearing detection unit 100 notifies the imaging control unit 40 of the detection result.

Using as a trigger the detection result that the digital side mirror unit 20 is stored, the detection result that the driver is aboard the vehicle, and the detection result that the driver is wearing the seat belt, the imaging control unit 40 controls the front imaging unit 10 and the digital side mirror unit 20 to start image capturing.

FIG. 8 is a flowchart illustrating the flow of the processing of an authentication method of the face authentication system 200C in FIG. 7. FIG. 8 is obtained by adding step S13 to FIG. 4. The differences between FIGS. 8 and 4 will be described below.

In step S3, the boarding detection unit 50 detects whether the driver is aboard the vehicle. Based on the detection result of the boarding detection unit 50, the imaging control unit 40 determines whether the driver is aboard the vehicle. If the driver is not aboard the vehicle (NO in step S3), the processing remains in step S3. If the driver is aboard the vehicle (YES in step S3), the processing proceeds to step S13.

In step S13, the seat belt wearing detection unit 100 detects whether the driver is wearing the seat belt of the vehicle. Based on the detection result of the seat belt wearing detection unit 100, the imaging control unit 40 determines whether the driver is wearing the seat belt. If the driver is not wearing the seat belt (NO in step S13), the processing returns to step S3. If the driver is wearing the seat belt (YES in step S13), the processing proceeds to step S4. The processes of steps other than step S13 are similar to those in FIG. 4, and therefore will not be described herein.

As described above, the seat belt wearing detection unit 100 detects whether the driver is wearing the seat belt. If the driver is wearing the seat belt, the driver is likely to be facing the front of the vehicle. Thus, the front imaging unit 10 and the digital side minor unit 20 start image capturing, and the face authentication unit 30 starts face authentication. The front imaging unit 10 and the digital side mirror unit 20 can capture the driver's face in the state where the driver is facing the front of the vehicle. Thus, it is possible to improve the recognition rate of face authentication in the face authentication unit 30.

The seat belt wearing detection unit 100 detects that the driver is wearing a seat belt of the movable apparatus (e.g., a vehicle). After the boarding detection unit 50 detects that the driver is aboard the movable apparatus, and the seat belt wearing detection unit 100 detects that the driver is wearing the seat belt of the movable apparatus, the face authentication unit 30 starts determining whether the above captured driver is the legitimate driver.

Based on the above, according to the present exemplary embodiment, the face authentication system 200C can improve the recognition rate of face authentication by measures to cause the driver to face the front of the vehicle when face authentication is performed. Consequently, it is possible to improve the recognition rate of face authentication in a case where the face authentication system 200C is used.

In the first exemplary embodiment, a description was provided of a method where the face authentication system 200A performs face recognition using videos captured by the front imaging unit 10 and the digital side mirror unit 20. In a case where face authentication is performed using a video captured by the digital side mirror unit 20 in the state where the digital side mirror unit 20 is stored, the angle of the stored digital side mirror unit 20 may not be optimized as an angle for increasing the recognition rate of face authentication. If an angle for increasing the recognition rate of face authentication of a video of the profile view image captured by the digital side mirror unit 20 is known, the angle of the digital side mirror unit 20 is changed to the known angle before face authentication is performed, thus enabling an increase in the recognition rate of face authentication.

Figure 9A:
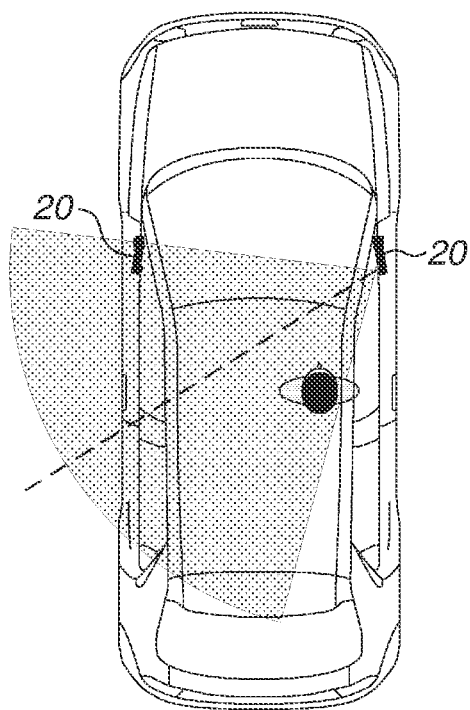
FIGS. 9A and 9B are diagrams respectively illustrating an imaging range of a digital side mirror before and after an angle of the digital side mirror is changed.
Figure 9B:
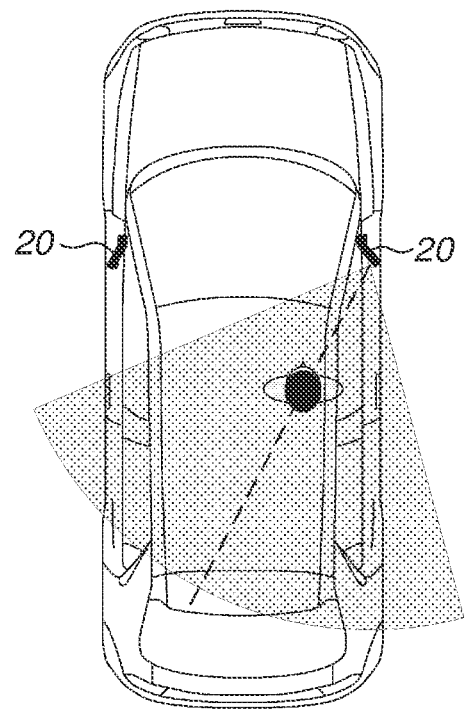

FIG. 9A is a diagram illustrating the imaging range of the digital side mirror unit 20 before the angle of the digital side mirror unit 20 is changed. In FIG. 9A, the profile view image of the driver's face is not present in the center of the imaging range. FIG. 9B is a diagram illustrating the imaging range of the digital side mirror unit 20 after the angle of the digital side mirror unit 20 is changed. In FIG. 9B, the profile view image of the driver's face is present in the center of the imaging range.

If, for example, the center of the imaging range corresponds to the angle for increasing the recognition rate of face authentication of the profile view image in terms of the properties of the camera, the angle of the digital side mirror unit 20 in FIG. 9B is the angle for increasing the recognition rate of face authentication of the profile view image. In a fourth exemplary embodiment, a description will be provided of a method for improving, before face authentication is performed, the recognition rate of face authentication by changing the angle of the digital side mirror unit 20 in FIG. 9A to the angle of the digital side mirror unit 20 in FIG. 9B at which the recognition rate of face authentication increases.

Figure 10:
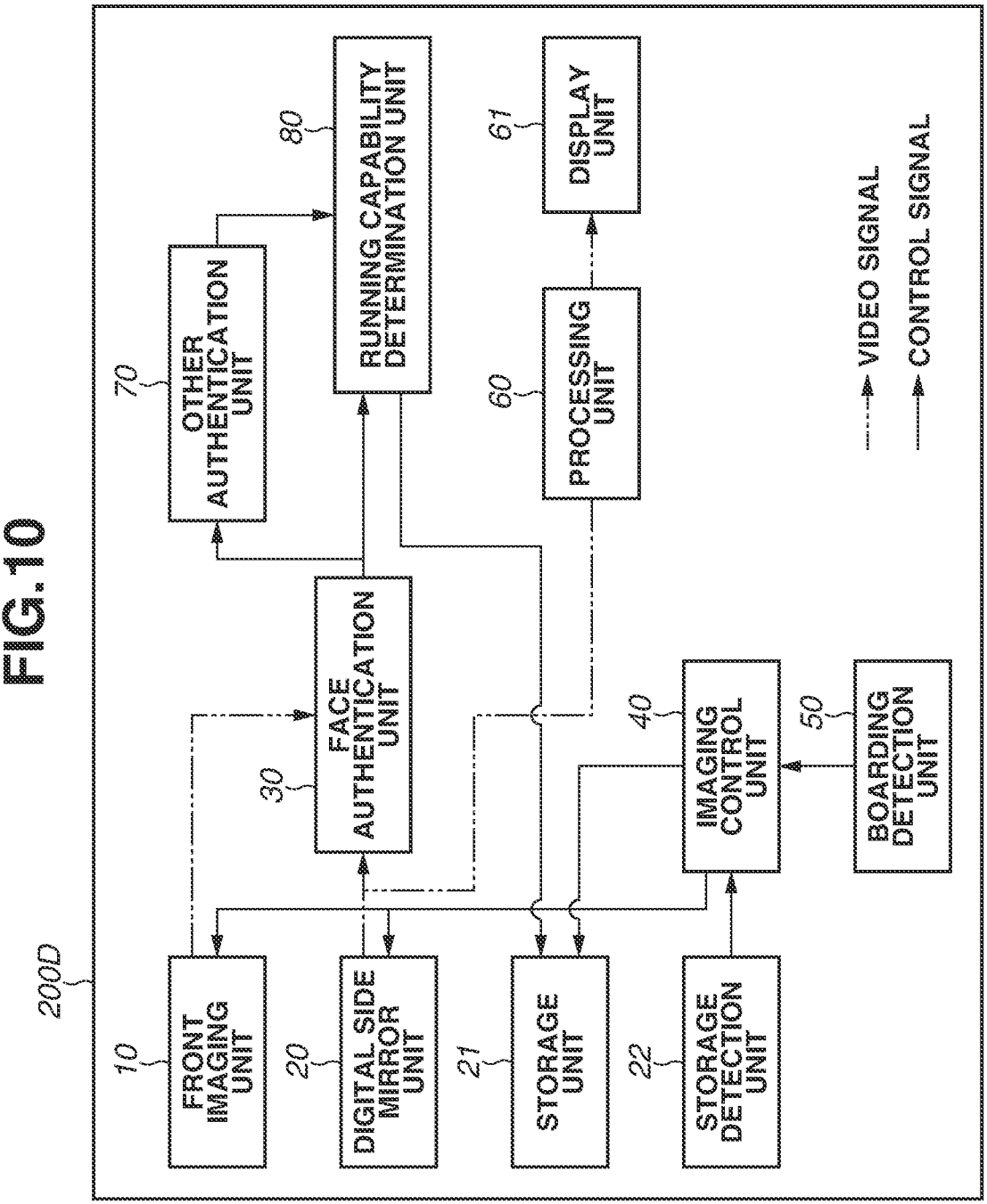
FIG. 10 is a diagram illustrating an example of a configuration of a face authentication system.

FIG. 10 is a diagram illustrating an example of the configuration of a face authentication system 200D according to the fourth exemplary embodiment. The face authentication system 200D includes the front imaging unit 10, the digital side mirror unit 20, the storage unit 21, the storage detection unit 22, the face authentication unit 30, the imaging control unit 40, the boarding detection unit 50, the processing unit 60, the display unit 61, the other authentication unit 70, and the running capability determination unit 80.

The face authentication system 200D is different from the face authentication system 200A in FIG. 1 in that the imaging control unit 40 outputs a control signal to the storage unit 21. The differences between the fourth and first exemplary embodiments will be described below.

In the face authentication system 200D, components other than the storage detection unit 22 and the imaging control unit 40 are similar to those in FIG. 1, and therefore will not be described.

The storage unit 21 can change the angle of the digital side mirror unit 20. Using a rotation angle sensor (not illustrated), the storage detection unit 22 detects that the digital side mirror unit 20 is stored in the storage unit 21. The storage detection unit 22 also detects that the digital side mirror unit 20 is changed to the angle for increasing the recognition rate of face authentication by the storage unit 21.

The angle of the digital side mirror unit 20 for increasing the recognition rate of face authentication is known and set as the angle of the digital side mirror unit 20 for increasing the recognition rate of face authentication. After the storage detection unit 22 detects that the digital side mirror unit 20 is stored in the storage unit 21, and if the storage detection unit 22 detects that the digital side mirror unit 20 is changed to the angle of the digital side mirror unit 20 for increasing the recognition rate of face authentication, the storage detection unit 22 notifies the imaging control unit 40 of the detection result.

Using as a trigger the detection result that the digital side mirror unit 20 is stored, and the detection result that the driver is aboard the vehicle, the imaging control unit 40 controls the storage unit 21 to change the angle of the digital side mirror unit 20 to the angle for increasing the recognition rate of face authentication. Then, the imaging control unit 40 controls the front imaging unit 10 and the digital side mirror unit 20 to start image capturing.

Figure 11:
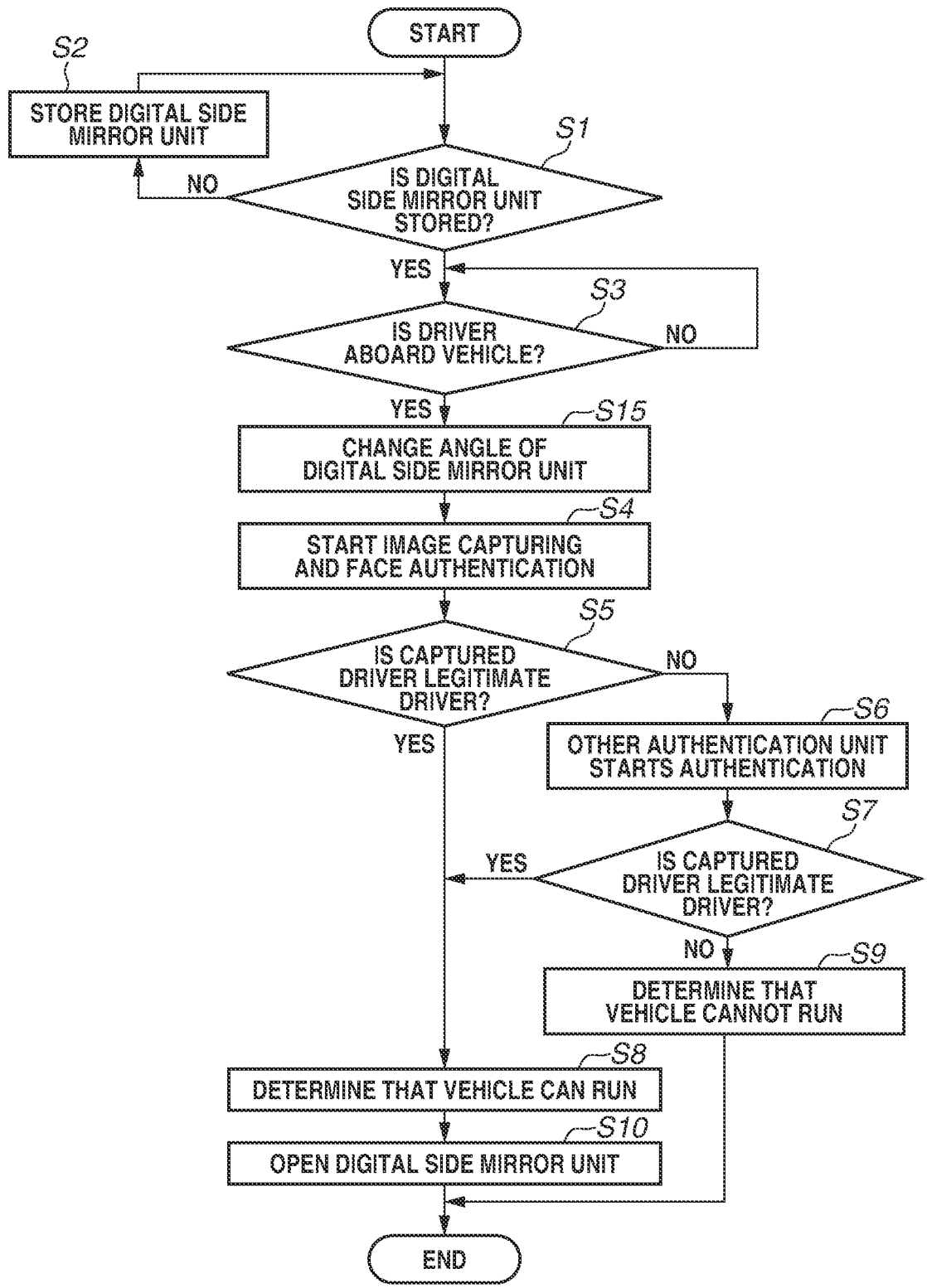
FIG. 11 is a flowchart illustrating a flow of processing of the face authentication system.

FIG. 11 is a flowchart illustrating the flow of the processing of an authentication method of the face authentication system 200D in FIG. 10. FIG. 11 is obtained by adding step S15 to FIG. 4. The differences between FIGS. 11 and 4 will be described below. In step S3, the boarding detection unit 50 detects whether the driver is aboard the vehicle. Based on the detection result of the boarding detection unit 50, the imaging control unit 40 determines whether the driver is aboard the vehicle. If the driver is not aboard the vehicle (NO in step S3), the processing remains in step S3. If the driver is aboard the vehicle (YES in step S3), the processing proceeds to step S15.

In step S15, the imaging control unit 40 controls the storage unit 21 to change the angle of the digital side mirror unit 20 to the angle for increasing the recognition rate of the profile view image. The storage unit 21 changes the angle of the digital side mirror unit 20 from the angle in FIG. 9A to the angle in FIG. 9B. The angle in FIG. 9A is the angle of the digital side mirror unit 20 in the state where the digital side mirror unit 20 is stored. The angle in FIG. 9B is the angle for increasing the recognition rate the profile view image of the driver's face. If the storage detection unit 22 detects that the angle of the digital side mirror unit 20 is changed to the angle in FIG. 9B, the storage detection unit 22 notifies the imaging control unit 40 of the detection result. When the imaging control unit 40 receives the notification, the processing proceeds to step S4. The processes of steps other than step S15 are similar to those in FIG. 4, and therefore will not be described herein.

If it is determined in step S1 in FIG. 11 that the digital side mirror unit 20 is not stored, then in step S2, the storage unit 21 stores the digital side mirror unit 20. In the present exemplary embodiment, since the angle of the digital side mirror unit 20 is changed before the face authentication in step S4 is performed, the digital side mirror unit 20 does not necessarily need to be stored before the face authentication. Thus, the face authentication system 200D can perform processing by skipping steps S1 and S2 as illustrated in FIG. 12.

Figure 12:
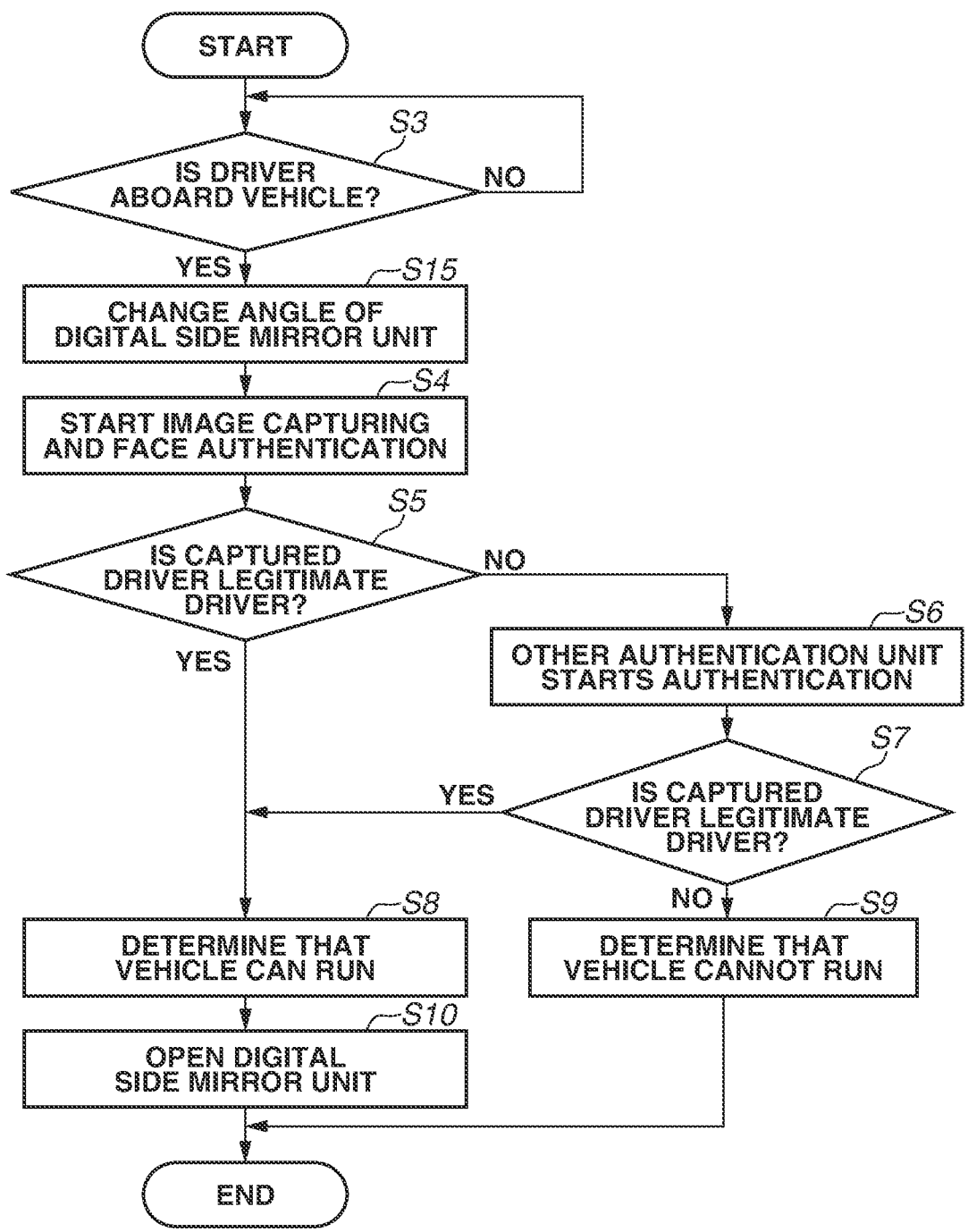
FIG. 12 is a flowchart illustrating a flow of processing of the face authentication system.

FIG. 12 is a flowchart illustrating the flow of the processing of another authentication method of the face authentication system 200D. FIG. 12 is obtained by removing steps S1 and S2 from FIG. 11. The face authentication system 200D performs the processes of step S3 and subsequent steps regardless of whether the digital side mirror unit 20 is stored. In step S15, the storage unit 21 changes the angle of the digital side minor unit 20 from the angle in FIG. 9A to the angle in FIG. 9B.

As described above, in step S15 before the determination of the face authentication unit 30, the angle of the digital side mirror unit 20 is changed from the angle in FIG. 9A in the state where the digital side mirror unit 20 is stored to the angle in FIG. 9B.

Based on the above description, according to the present exemplary embodiment, the face authentication system 200D changes the angle of the digital side mirror unit 20 from the angle in FIG. 9A to the angle in FIG. 9B before face authentication is performed, thereby enabling improvement of the recognition rate of face authentication.

In the first to fourth exemplary embodiments, descriptions were provided of methods where the face authentication systems 200A to 200D perform face recognition using videos captured by the front imaging unit 10 and the digital side mirror unit 20. In a fifth exemplary embodiment, a description will be provided of a method for performing face recognition by image capturing at a plurality of angles using an imaging unit that can capture the driver at an angle other than from the front instead of using the digital side minor unit 20.

Figure 13:
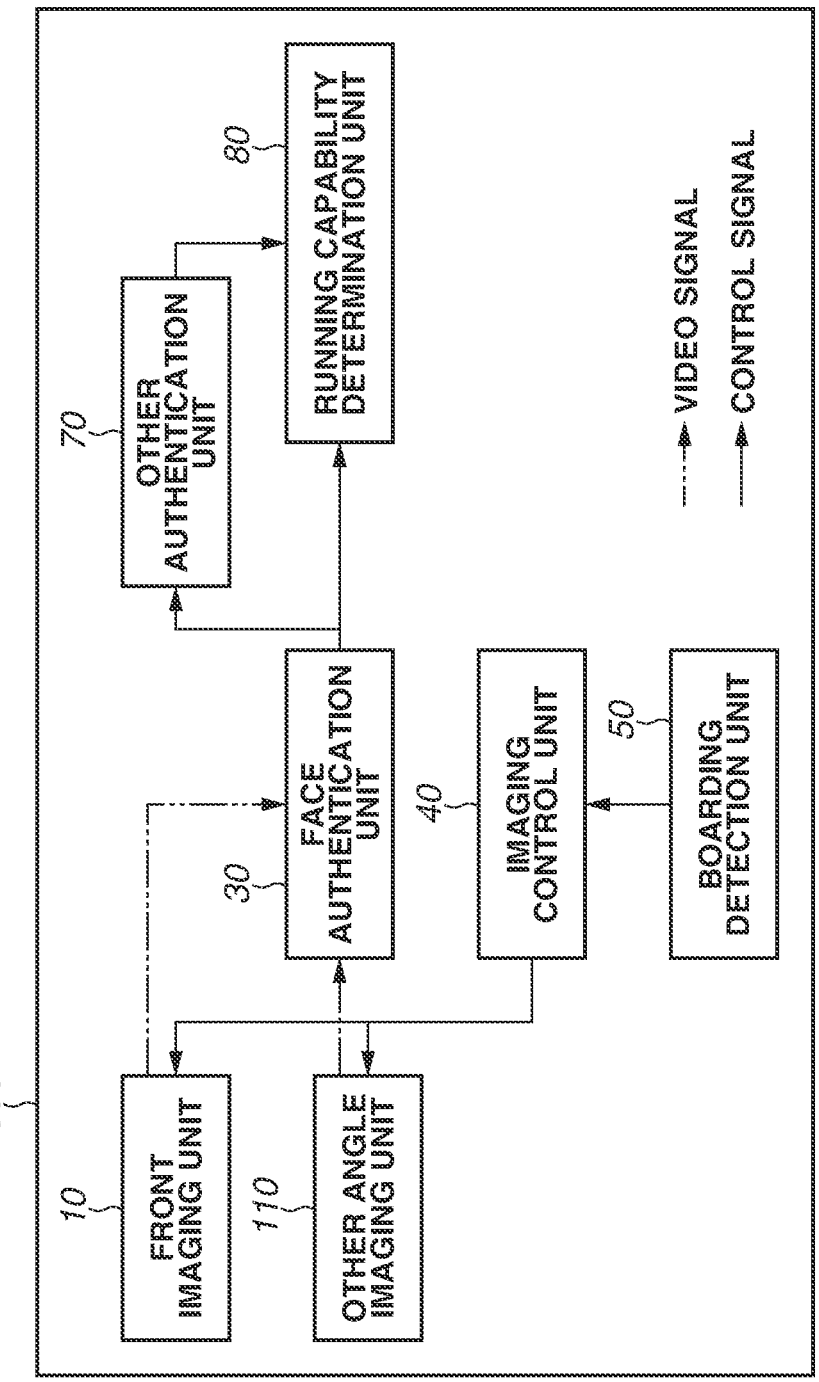
FIG. 13 is a diagram illustrating an example of a configuration of a face authentication system.

FIG. 13 is a diagram illustrating an example of the configuration of a face authentication system 300 according to the fifth exemplary embodiment. The face authentication system 300 is a system that performs face authentication by image capturing at a plurality of angles. The face authentication system 300 includes the front imaging unit 10, an other angle imaging unit 110, the face authentication unit 30, the imaging control unit 40, the boarding detection unit 50, the other authentication unit 70, and the running capability determination unit 80.

The face authentication system 300 is obtained by removing the digital side minor unit 20, the storage unit 21, the storage detection unit 22, the processing unit 60, and the display unit 61 from the face authentication system 200A in FIG. 1 and adding the other angle imaging unit 110 to the face authentication system 200A in FIG. 1. The differences between the fifth and first exemplary embodiments will be described below.

The front imaging unit 10 is a camera installed in front of the driver's seat of a vehicle and captures an image of the driver's face from in front of the driver. The front imaging unit 10 can share an imaging function with a camera for the purpose of observing the state of the driver while driving, such as a driver monitoring system (DMS). The timing of image capturing by the front imaging unit 10 in face authentication is controlled by the imaging control unit 40. A video captured by the front imaging unit 10 is transmitted to the face authentication unit 30.

The other angle imaging unit 110 is a camera that captures the profile view image of the driver's face at an angle different from the angle of the front imaging unit 10. For example, the other angle imaging unit 110 is an in-vehicle monitoring camera, but this is not seen to be limiting.

Based on a video of the front view image of the driver's face captured by the front imaging unit 10 and a video of the profile view image of the driver's face captured by the other angle imaging unit 110, the face authentication unit 30 determines whether the driver seated in the driver's seat is a legitimate driver. For example, the face authentication unit 30 detects a face from videos captured by the front imaging unit 10 and the other angle imaging unit 110 and calculates information useful to identify a person, such as the shapes of and the positional relationships between the eyes and the nose, as a feature amount. The face authentication unit 30 checks the feature amount of the front view image and the profile view image of the legitimate driver's face stored in the storage unit against the feature amount of the front view image and the profile view image of the captured driver's face. Based on whether the degree of similarity between the feature amounts exceeds a certain value, the face authentication unit 30 determines whether the captured driver is the legitimate driver. This method for determining whether the captured driver is the legitimate driver is not seen to be limiting. The face authentication unit 30 notifies the running capability determination unit 80 of the result of determining that the driver seated in the driver's seat is the legitimate driver. The face authentication unit 30 notifies the other authentication unit 70 of the result of determining that the driver seated in the driver's seat is not the legitimate driver.

Using as a trigger the fact that the boarding detection unit 50 detects that the driver is aboard the vehicle, the imaging control unit 40 controls the front imaging unit 10 and the other angle imaging unit 110 to start image capturing.

The boarding detection unit 50 detects that the driver is aboard the vehicle in the driver's seat. As the detection method, based on the fact that the side door on the driver's seat side is closed after being opened, the boarding detection unit 50 detects that the driver is aboard the vehicle in the driver's seat. To exclude the mere opening and closing of the side door when the driver is not seated in the driver's seat, the boarding detection unit 50 can also detect the weight of the driver's seat at the same time. If the boarding detection unit 50 detects that the driver is aboard the vehicle in the driver's seat, the boarding detection unit 50 notifies the imaging control unit 40 of the detection result.

If authentication by the face authentication unit 30 fails even when the legitimate driver is seated in the driver's seat, the other authentication unit 70 determines that the driver is the legitimate driver using another method. The other authentication unit 70 notifies the running capability determination unit 80 of the result of the determination. If the other angle imaging unit 110 fails in image capturing, the other authentication unit 70 can additionally request the driver by voice to perform the action of moving the driver's face to the left and to the right, and can perform face authentication using the front imaging unit 10 alone, thereby enabling forgery prevention measures. In another embodiment, the other authentication unit 70 can prompt the driver to input a personal identification number and a password. Then, based on whether the input personal identification number and password match a pre-registered personal identification number and a password to permit authentication, the other authentication unit 70 can determine whether the driver is the legitimate driver.

The above example is merely an example of an authentication method employed by the other authentication unit 70, and is not seen to be limiting. Since the other authentication unit 70 requests the driver to perform some action or operation, authentication by the other authentication unit 70 has lower priority than authentication by the face authentication unit 30. There can be a plurality of other authentication units 70, and the plurality of other authentication units 70 can be applied in a stepwise manner. For example, if the other authentication unit 70 fails in authentication where the other authentication unit 70 additionally requests the driver to perform the action of moving the driver's face to the left and to the right and performs face authentication using the front imaging unit 10 alone, the other authentication unit 70 can prompt the driver to input a personal identification number and a password, and can authenticate the driver, thereby performing authentication at multiple steps.

If the running capability determination unit 80 receives from the face authentication unit 30 or the other authentication unit 70 a notification that the driver is recognized as the legitimate driver, the running capability determination unit 80 determines that the vehicle can run. If the running capability determination unit 80 determines that the vehicle can run, the running capability determination unit 80 enables the driver to start the vehicle's engine and to put the vehicle into drive. If neither the face authentication unit 30 nor the other authentication unit 70 determine that the driver is the legitimate driver, the running capability determination unit 80 determines that the vehicle cannot run, and does not enable the driver to start the vehicle's engine or to put the vehicle into drive. This prevents the vehicle from being driven and prevents theft of the vehicle. If the running capability determination unit 80 determines that the vehicle cannot run, the running capability determination unit 80 can transmit videos of the front view image of the driver's face captured by the front imaging unit 10 and the profile view image of the driver's face captured by the other angle imaging unit 110 to the legitimate driver, and the videos could be used as circumstantial evidence in a case of a vehicle theft. While face authentication has been described in the present exemplary embodiment, if the running capability determination unit 80 determines that the vehicle can run, the running capability determination unit 80 can also automatically adjust the position of the seat and the position of the steering wheel in the vehicle.

Figure 14:
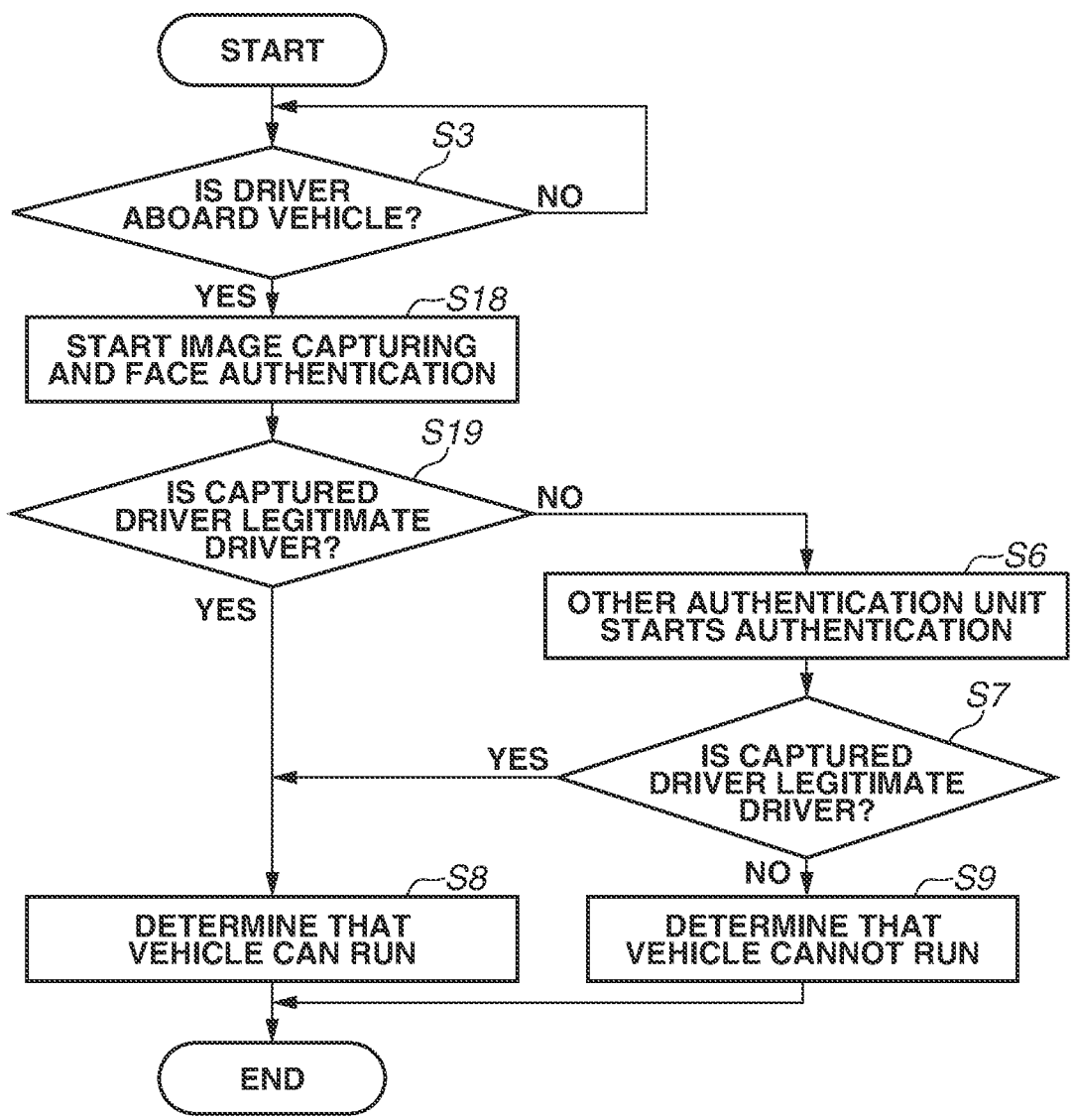
FIG. 14 is a flowchart illustrating a flow of processing of the face authentication system.

FIG. 14 is a flowchart illustrating the flow of the processing of an authentication method of the face authentication system 300 in FIG. 13. FIG. 14 is obtained by removing steps S1, S2, S4, S5, and S10 from FIG. 4 and adding steps S18 and S19 to FIG. 4. The differences between FIGS. 14 and 4 will be described below.

The face authentication system 300 starts the process of step S3 without performing the processes of steps S1 and S2 in FIG. 4. In step S3, the boarding detection unit 50 detects whether the driver is aboard the vehicle. Based on the detection result of the boarding detection unit 50, the imaging control unit 40 determines whether the driver is aboard the vehicle. If the driver is not aboard the vehicle (NO in step S3), the processing remains in step S3. If the driver is aboard the vehicle (YES in step S3), the processing proceeds to step S18.

In step S18, the imaging control unit 40 controls the front imaging unit 10 and the other angle imaging unit 110 to start image capturing. The front imaging unit 10 starts capturing the front view image of the driver's face, and the other angle imaging unit 110 starts capturing the profile view image of the driver's face. Based on a video of the front view image of the driver's face captured by the front imaging unit 10 and a video of the profile view image of the driver's face captured by the other angle imaging unit 110, the face authentication unit 30 authenticates the driver's face. Then, the processing proceeds to step S19.

In step S19, the face authentication unit 30 compares data of the front view image and the profile view image of the legitimate driver's face stored in the storage unit and the videos of the front view image and the profile view image of the above captured driver's face and determines whether the captured driver is the legitimate driver. If the captured driver is the legitimate driver (YES in step S19), the processing proceeds to step S8. If the captured driver is not the legitimate driver (NO in step S19), the processing proceeds to step S6.

The processes of steps other than steps S18 and S19 are similar to those in FIG. 4, and therefore will not be described herein. If, however, the process of step S8 is completed, the process of step S10 in FIG. 4 is not performed, and the processing of the flowchart in FIG. 14 ends.

While in the above-described exemplary embodiment, for convenience, a description has been provided based on the assumption that the other angle imaging unit 110 captures the profile view image of the driver's face, this is not seen to be limiting. The other angle imaging unit 110 can capture the driver's face at any angle other than the front view image of the face as long as it is possible to prevent a forgery of the legitimate driver.

As described above, the face authentication system 300 is a driver face authentication system provided in a movable apparatus (e.g., a vehicle). The front imaging unit 10 captures a face of a driver at a first angle. The other angle imaging unit 110 captures the driver's face at a second angle different from the first angle. For example, the front imaging unit 10 captures a front view image of the driver's face, and the other angle imaging unit 110 captures a profile view image of the driver's face. The boarding detection unit 50 detects that the driver is aboard the movable apparatus.

After the boarding detection unit 50 detects that the driver is aboard the movable apparatus, the front imaging unit 10 and the other angle imaging unit 110 start image capturing. After the boarding detection unit 50 detects that the driver is aboard the movable apparatus, then based on a video captured by the front imaging unit 10 and a video captured by the other angle imaging unit 110, the face authentication unit 30 starts determining whether the driver captured by the front imaging unit 10 and the other angle imaging unit 110 is a legitimate driver.

Based on the above, according to the present exemplary embodiment, the face authentication system 300 performs face recognition by image capturing at a plurality of angles using the other angle imaging unit 110 that can capture the driver's face at an angle other than the front view image instead of the digital side mirror unit 20. Consequently, it is possible to perform face recognition by image capturing at a plurality of angles without adding a dedicated camera for image capturing at a plurality of angles.

The present disclosure can also be achieved by the process of supplying a program for achieving one or more functions of the above exemplary embodiments to a system or an apparatus via a network or a storage medium, and causing one or more processors of a computer of the system or the apparatus to read and execute the program. The present disclosure can also be achieved by a circuit (e.g., an application-specific integrated circuit (ASIC)) for achieving the one or more functions.

Parts of the above exemplary embodiments can be combined together as appropriate.

According to the present disclosure, it is possible to prevent a forgery using a face photograph and start face authentication at an appropriate timing.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, these embodiments are not seen to be limiting. The scope of the following claims is to be accorded the broadest interpretation so as to encompass all such modifications and equivalent structures and functions.

This application claims the benefit of Japanese Patent Application No. 2022-152529, filed Sep. 26, 2022, which is hereby incorporated by reference herein in its entirety.

What is claimed is:

1. A driver face authentication system provided in a movable apparatus, the driver face authentication system comprising:
   one or more hardware processors; and
   one or more memories storing one or more programs configured to be executed by the one or more hardware processors, the one or more programs including instructions for:
   capturing a face of a driver at a first angle;
   capturing the driver's face at a second angle different from the first angle;
   detecting that the driver is aboard the movable apparatus; and
   determining, after detecting that the driver is aboard the movable apparatus, based on a video obtained by capturing the driver's face at the first angle and a video obtained by capturing the driver's face at the second angle, whether the captured driver is a legitimate driver of the movable apparatus.

2. The face authentication system according to claim 1, wherein the captured image of the face of the driver at the first angle is a front view image of the driver's face, and
   wherein the captured image of the face of the driver at the second angle is a profile view image of the driver's face.

3. The face authentication system according to claim 1, wherein the one or more programs further include instructions for starting image capturing by detecting that the driver is aboard the movable apparatus.

4. The face authentication system according to claim 1, wherein the one or more programs further include instructions for, in a case where the captured driver is determined to be not the legitimate driver, determining whether the captured driver is the legitimate driver using a method different from a method used for authentication of the face of the captured driver.

5. The face authentication system according to claim 1, wherein the one or more programs include instructions for capturing the driver's face at the second angle by a digital side mirror.

6. The face authentication system according to claim 5, wherein the one or more programs include instructions for capturing the driver's face at the second angle while determining whether the captured driver is the legitimate driver, and
   wherein the one or more programs further include instructions for capturing a rear side of the movable apparatus at a third angle different from the second angle in a case where the captured driver is determined to be the legitimate driver.

7. The face authentication system according to claim 5, wherein the second angle is an angle in a state where the digital side mirror is stored.

8. The face authentication system according to claim 5, wherein, before determining whether the captured driver is the legitimate driver, an angle of the digital side mirror is changed from an angle in a state where the digital side mirror is stored to the second angle.

9. The face authentication system according to claim 1, wherein the one or more programs further include instructions for detecting that the driver is holding a steering wheel of the movable apparatus, and
   wherein the one or more programs include instructions for determining, after detecting that the driver is aboard the movable apparatus and that the driver is holding the steering wheel of the movable apparatus, whether the captured driver is the legitimate driver.

10. The face authentication system according to claim 1, wherein the one or more programs further include instructions for detecting that the driver is wearing a seat belt of the movable apparatus, and
    wherein the one or more programs include instructions for determining, after detecting that the driver is aboard the movable apparatus and that the driver is wearing the seat belt of the movable apparatus, whether the captured driver is the legitimate driver.

11. An authentication method of a driver face authentication system provided in a movable apparatus, the authentication method comprising:
    capturing a face of a driver at a first angle;
    capturing the driver's face at a second angle different from the first angle;
    detecting that the driver is aboard the movable apparatus; and
    determining, after detecting that the driver is aboard the movable apparatus, based on a video obtained by capturing the driver's face at the first angle and a video obtained by capturing the driver's face at the second angle, whether the captured driver is a legitimate driver of the movable apparatus.

12. A non-transitory computer-readable storage medium storing a program that causes a computer to execute an authentication method of a driver face authentication system provided in a movable apparatus, the authentication method comprising:
    capturing a face of a driver at a first angle;
    capturing the driver's face at a second angle different from the first angle;
    detecting that the driver is aboard the movable apparatus; and
    determining, after detecting that the driver is aboard the movable apparatus, based on a video obtained by capturing the driver's face at the first angle and a video obtained by capturing the driver's face at the second angle, whether the captured driver is a legitimate driver of the moving apparatus.

\* \* \* \* \*